(12) United States Patent
Kim et al.

(10) Patent No.: US 10,904,445 B2
(45) Date of Patent: Jan. 26, 2021

(54) ZOOM TRACKING METHOD AND ZOOM CAMERA

(71) Applicant: HANWHA TECHWIN CO., LTD., Seongnam-si (KR)

(72) Inventors: Dae Bong Kim, Seongnam-si (KR); Young Sang Kwon, Seongnam-si (KR); Ki Bum Park, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/493,055

(22) PCT Filed: Jun. 27, 2017

(86) PCT No.: PCT/KR2017/006780
§ 371 (c)(1),
(2) Date: Sep. 11, 2019

(87) PCT Pub. No.: WO2018/174340
PCT Pub. Date: Sep. 27, 2018

(65) Prior Publication Data
US 2020/0092485 A1    Mar. 19, 2020

(30) Foreign Application Priority Data
Mar. 21, 2017 (KR) .......................... 10-2017-0035510

(51) Int. Cl.
*H04N 5/232* (2006.01)
(52) U.S. Cl.
CPC ..... *H04N 5/23296* (2013.01); *H04N 5/23299* (2018.08); *H04N 5/232121* (2018.08)

(58) Field of Classification Search
USPC .................................. 348/240.99, 345, 349
See application file for complete search history.

(56) References Cited

U.S. PATENT DOCUMENTS

| | | | |
|---|---|---|---|
| 5,486,860 A * | 1/1996 | Shiokawa | H04N 5/23212 348/354 |
| 7,755,695 B2 * | 7/2010 | Natsume | H04N 5/23212 348/208.11 |

(Continued)

FOREIGN PATENT DOCUMENTS

| | | |
|---|---|---|
| JP | 1994-217181 A | 8/1994 |
| JP | 1996-086953 A | 4/1996 |

(Continued)

OTHER PUBLICATIONS

International Search Report dated Dec. 14, 2017; PCT/KR2017/006780.

(Continued)

*Primary Examiner* — Anthony J Daniels
(74) *Attorney, Agent, or Firm* — McLean IP Global; Jason Y. Pahng (57) ABSTRACT

A zoom tracking method performed by a control unit of a zoom camera includes operations (a) through (c). In operation (a), the control unit determines a focusing progress state at a time when a zooming start signal is received. In operation (b), the control unit narrows an estimated range of a subject distance or estimates the subject distance, according to the focusing progress state. In operation (c), the control unit performs focusing for a zoom magnification according to the narrowed estimated range or the estimated subject distance.

3 Claims, 7 Drawing Sheets

(56) References Cited

U.S. PATENT DOCUMENTS

| | | | |
|---|---|---|---|
| 9,503,650 B2 | 11/2016 | Kim et al. | |
| 2003/0030735 A1 | 2/2003 | Ike | |
| 2012/0008037 A1* | 1/2012 | Yamanaka | H04N 5/23212 348/345 |
| 2012/0229608 A1 | 9/2012 | Sawachi | |
| 2014/0218564 A1* | 8/2014 | Tomosada | G03B 13/36 348/231.6 |
| 2015/0312484 A1* | 10/2015 | Kim | H04N 5/23212 348/240.3 |
| 2017/0237893 A1* | 8/2017 | Kishida | H04N 5/23296 348/240.3 |
| 2018/0217352 A1* | 8/2018 | Kamba | G02B 7/102 |

FOREIGN PATENT DOCUMENTS

| | | |
|---|---|---|
| JP | 2000-258680 A | 9/2000 |
| JP | 2003-057526 A | 2/2003 |
| JP | 2012-255910 A | 12/2012 |
| JP | 2014-006398 A | 1/2014 |
| JP | 2015-141207 A | 8/2015 |
| JP | 2015-155988 A | 8/2015 |
| KR | 1020050115000 A | 12/2005 |
| KR | 1020060121436 A | 11/2006 |
| KR | 1020070016351 A | 2/2007 |
| KR | 100841290 B1 | 6/2008 |
| KR | 10-2011-0057622 A | 6/2011 |
| KR | 101293245 B1 | 8/2013 |
| KR | 10-2016-0062936 A | 6/2016 |
| KR | 1020160139304 A | 12/2016 |

OTHER PUBLICATIONS

Written Opinion dated Dec. 14, 2017; PCT/KR2017/006780.
Korean Office Action dated Nov. 19, 2020 for KR patent application 10-2017-0035510.

* cited by examiner

ZOOM TRACKING METHOD AND ZOOM CAMERA

TECHNICAL FIELD

The present disclosure relates to a zoom tracking method and a zoom camera, and more particularly, to a zoom tracking method performed by a control unit of a zoom camera and a zoom camera using the zoom tracking method.

BACKGROUND ART

A user may command a zooming operation of a zoom camera by pressing a tele-zooming button or a wide zooming button of the zoom camera. In other words, a control unit of a zoom camera may receive a tele-zooming start signal or a wide zooming start signal from a user input unit. Accordingly, the control unit performs a zoom tracking operation together with the zooming operation.

As is well known, the zoom tracking operation is a focusing operation performed together with the zooming operation. When zoom tracking performance is low, a user feels annoyed and inconvenienced while zooming. In particular, in the case of a zoom camera for surveillance, a surveillance gap may occur when the zoom tracking performance is low.

To perform a fast focusing operation in correspondence to a fast zooming operation, a plurality of zoom tracking curves are required. The zoom tracking curves show a focus-lens position value with respect to a zoom magnification for each subject distance. These zoom tracking curves may be used based on the assumption that the control unit of the zoom camera has already been given the subject distance with respect to a fixed subject.

However, in most zoom tracking, the control unit of the zoom camera may not have been given a subject distance. In this case, the control unit of the zoom camera needs to perform focusing at a zoom magnification with respect to all subject distances in an estimated range. Accordingly, a focusing time for a zoom magnification is long, and therefore, a focusing speed decreases as compared to a speed at which the zoom magnification changes. In other words, since a zoom magnification changes before focusing for the zoom magnification is completed, the zoom tracking performance is degraded.

In this case, a user feels annoyed and inconvenienced because the user cannot see a clear image during zooming. In particular, in the case of a zoom camera for surveillance, a surveillance gap may occur during zooming.

The issues disclosed in this Background section were already known to the inventors of the present disclosure before achieving the present disclosure or are information acquired in the process of achieving the present disclosure and thus may contain information that does not form the prior art that is already known to the public.

DESCRIPTION OF EMBODIMENTS

Technical Problem

Provided are a zoom tracking method and a zoom camera, whereby a user is allowed to see a clear image during zooming for an unknown subject distance.

Solution to Problem

According to an aspect of the present disclosure, a zoom tracking method performed by a control unit of a zoom camera includes operations (a) through (c).

In operation (a), the control unit determines a focusing progress state at a time when a zooming start signal is received.

In operation (b), the control unit narrows an estimated range of a subject distance or estimates the subject distance, according to the focusing progress state.

In operation (c), the control unit performs focusing for a zoom magnification according to the narrowed estimated range or the estimated subject distance.

According to another aspect of the present disclosure, a zoom camera uses the zoom tracking method described above.

Advantageous Effects of Disclosure

According to a zoom tracking method and a zoom camera in an aspect of the present disclosure, an estimated range of a subject distance may be narrowed or the subject distance may be estimated, according to a focusing progress state at a time when a zooming start signal is received. Since focusing is performed for a zoom magnification according to the narrowed estimated range or the estimated subject distance, as described above, a focusing speed for the zoom magnification may be increased.

Accordingly, the probability of a zoom magnification being changed after completion of focusing for the zoom magnification is increased. As a result, a user is allowed to see a clear image during zooming. In particular, in the case of a zoom camera for surveillance, a surveillance gap during the zooming may be reduced.

BEST MODE

Descriptions below and the attached drawings are provided to give an understanding of operations according to embodiments, and any parts that can be easily embodied by one of ordinary skill in the art may be omitted.

In addition, the specification and the drawings should not be construed as limiting the embodiments, and the scope of the embodiments is defined by the appended claims. Terms used in the specifications should be interpreted as having a meaning and a concept that is consistent with the technical ideas of the embodiments so as to most appropriately describe the embodiments.

Hereinafter, the embodiments will be described in detail with reference to the attached drawings.

Figure 1:
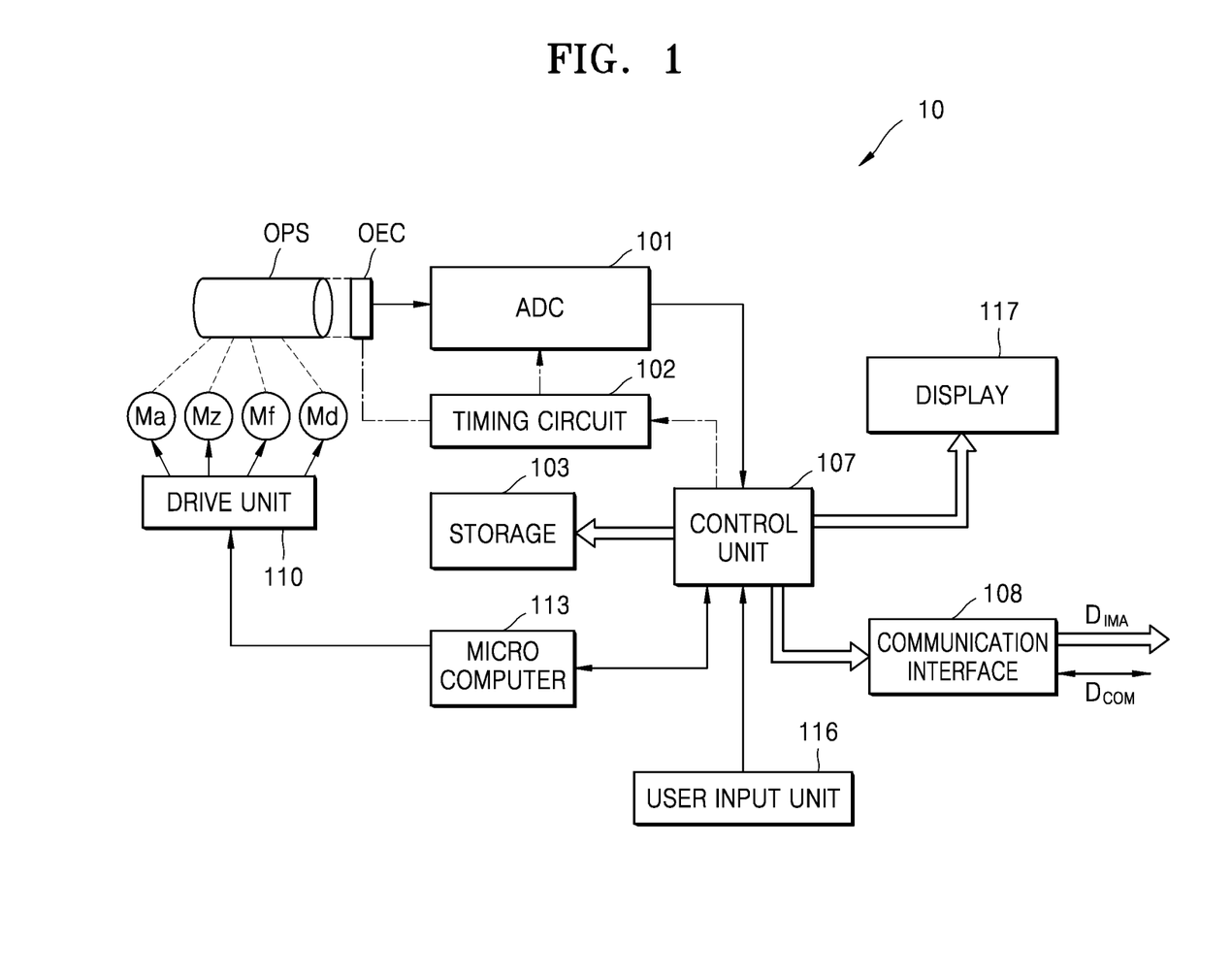
FIG. 1 is a diagram showing an example of a zoom camera using a zoom tracking method, according to an embodiment.

FIG. 1 is a diagram showing an example of a zoom camera using a zoom tracking method, according to an embodiment. When the zoom camera of FIG. 1 is for surveillance, panning and tilting functions may be added.

Referring to FIG. 1, a zoom camera 10 includes an optical system OPS, an optoelectronic converter OEC, an analog-to-digital converter (ADC) 201, a control unit 107, a storage 103, a communication interface 108, a drive unit 110, a microcomputer 113, an aperture motor Ma, a zoom motor Mz, a focus motor Mf, a filter motor Md, a user input unit 116, and a display 117.

The optical system OPS, which includes lenses and an infrared cutoff filter, optically processes light from a subject. The lenses of the optical system OPS include a zoom lens and a focus lens.

The optoelectronic converter OEC, e.g., a charge coupled device (CCD) optoelectronic converter or a complementary metal-oxide-semiconductor (CMOS) optoelectronic converter, converts light from the optical system OPS into an electrical analog signal. At this time, the control unit 107 controls a timing circuit 102 to control the operations of the optoelectronic converter OEC and the ADC 101.

The ADC 101 converts an analog image signal from the optoelectronic converter OEC into a digital image signal. In detail, the ADC 101 removes high-frequency noise from an analog image signal from the optoelectronic converter OEC, adjusts an amplitude of the analog image signal, and generates a digital image signal. The digital image signal is input to the control unit 107.

The control unit 107, e.g., a digital signal processor, which operates according to control data from the user input unit 116, converts a format of the digital image signal from the ADC 101 while controlling the operations of the optical system OPS, the optoelectronic converter OEC, and the ADC 101. In detail, the control unit 107 processes a digital signal from the ADC 101 to generate a digital image signal that is divided into a luminance signal and a hue signal.

The storage 103 selectively stores a live-view moving image from the control unit 107.

The display 117 displays the live-view moving image from the control unit 107.

The control unit 107 transmits live-view moving image data $D_{IMA}$ to an external device while exchanging communication signals $D_{COM}$ with the external device through the communication interface 108.

Meanwhile, the microcomputer 113 controls the drive unit 110 to drive the aperture motor Ma, the zoom motor Mz, the focus motor Mf, and the filter motor Md.

The aperture motor Ma drives an aperture, the zoom motor Mz drives the zoom lens, the focus motor Mf drives the focus lens. The filter motor Md drives the infrared cutoff filter.

Figure 2:
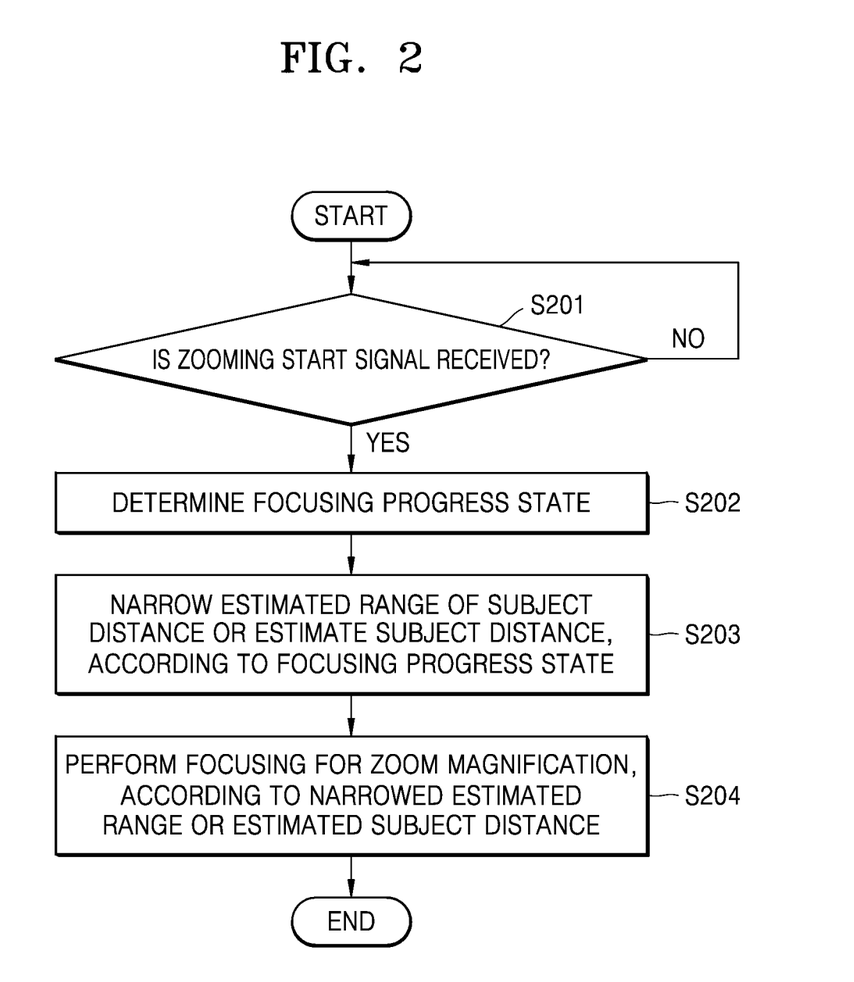
FIG. 2 is a flowchart showing a zoom tracking method performed by a control unit in FIG. 1.

FIG. 2 illustrates a zoom tracking method performed by the control unit 107 in FIG. 1. The zoom tracking method will be described with reference to FIGS. 1 and 2 below.

A user may command a zooming operation of the zoom camera by pressing a tele-zooming button or a wide-zooming button of the user input unit 116. In other words, the control unit 107 may receive a tele-zooming start signal or a wide zooming start signal from the user input unit 116. Accordingly, the control unit 107 performs a zoom tracking operation together with the zooming operation.

The control unit 107 determines whether a zooming start signal is received from the user input unit 116 in operation S201. When the zooming start signal is received, subsequent operations are performed.

The control unit 107 determines a focusing progress state at the time when the zooming start signal is received in operation S202.

In addition, the control unit 107 narrows an estimated range of a subject distance or estimates the subject distance, according to the focusing progress state, in operation S203. Operation S203 will be described in detail with reference to FIG. 5.

The control unit 107 performs focusing for a zoom magnification, according to the narrowed estimated range or the estimated subject distance, in operation S204.

According to the zoom tracking method of the embodiment of FIG. 2, the estimated range of the subject distance may be narrowed or the subject distance may be estimated, according to the focusing progress state at the time when the zooming start signal is received. Since the focusing is performed for a zoom magnification according to the narrowed estimated range or the estimated subject distance, as described above, a focusing speed for the zoom magnification may be increased.

Accordingly, the probability of a zoom magnification being changed after completion of focusing for the zoom magnification is increased. As a result, a user is allowed to see a clear image during zooming. In particular, in the case of a zoom camera for surveillance, a surveillance gap during the zooming may be reduced.

Figure 3:
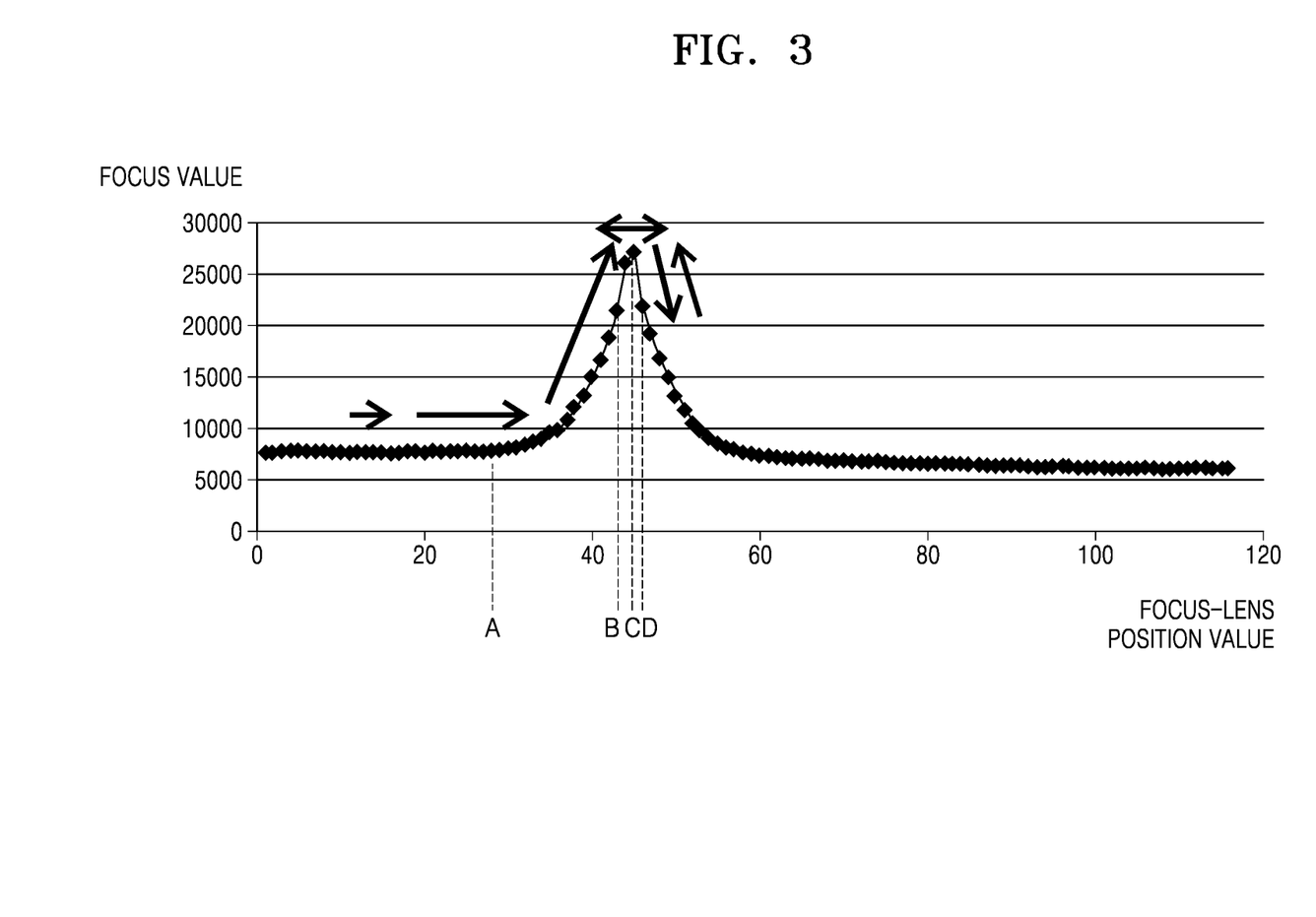
FIG. 3 is a diagram showing a focusing process performed by the control unit in FIG. 1.

FIG. 3 is a diagram showing a focusing process performed by the control unit 107 in FIG. 1. The focusing process will be described below.

A focus lens starts from a point having a position value of zero and moves by a first gap step by step, and the control unit 107 obtains a focus value at each position. As is well known, a typical example of the focus value is a contrast value of an image.

When the focus value does not increase up to a point A, a section from 0 to A is referred to as an initial movement section.

When a decrease in the focus value is detected for the first time at a point D since the focus value increases after the point A, a section from A to D is referred to as an increasing movement section.

When the first decreasing point, i.e., the point D, is detected since the focus value increases, the control unit 107 searches back for a position of a peak focus value between a point (e.g., a point B) of a maximum focus value, which is detected in the increasing movement section from A to D, and the first decreasing point, i.e., the point D. In this case, a section between D and B is referred to as a peak search section. A step movement gap in the peak search section between D and B is narrower than the first gap.

When a point C is found as the position of the peak focus value in the peak search section between D and B, the point C is referred to as a focusing completion point.

Accordingly, the focusing progress state is classified into an initial movement state corresponding to the section from 0 to A, an increasing movement state corresponding to the section from A to D, a peak search state corresponding to the section between D and B, and a focusing completion state corresponding to the point C, in operation S202 in FIG. 2. According to such focusing progress state, the control unit 107 narrows the estimated range of the subject distance in operation S203. Operation S203 will be described in detail with reference to FIG. 5.

Figure 4:
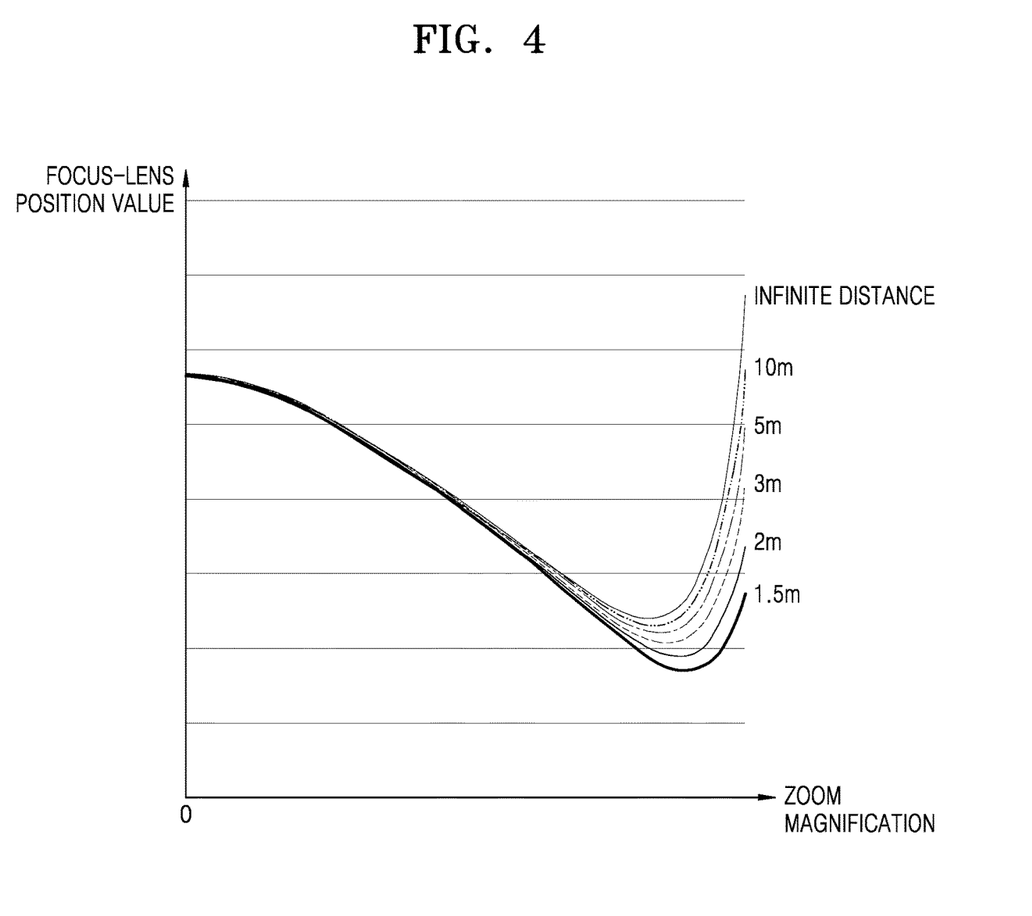
FIG. 4 is a diagram showing examples of zoom tracking curves stored in the control unit in FIG. 1.

FIG. 4 shows examples of zoom tracking curves stored in the control unit 107 in FIG. 1. Referring to FIG. 4, the control unit 107 stores zoom tracking curves respectively for 1.5-m, 2-m, 3-m, 5-m, 10-m, and infinite subject distances. Each of the zoom tracking curves shows a focus-lens position value with respect to a zoom magnification at a certain subject distance.

In an embodiment, the zoom tracking curves stored in the control unit 107 are used when the focusing progress state is the focusing completion state corresponding to the point C in FIG. 2. In other words, the control unit 107 is already given a focus-lens position value corresponding to a peak focus value and a zoom magnification at a zooming start point and may thus estimate a subject distance corresponding thereto. In addition, the control unit 107 may deduce a zoom tracking curve corresponding to an estimated subject distance.

For example, when the estimated subject distance is 13 m, the control unit 107 may deduce a zoom tracking curve corresponding to 13 m using the zoom tracking curve corresponding to 10 m and the zoom tracking curve corresponding to an infinite distance. At this time, since gaps among the zoom tracking curves are widest at a maximum zoom magnification, focus-lens position values at the maximum zoom magnification are used. Details related to this will be described with reference to FIGS. 6 and 7.

Figure 5:
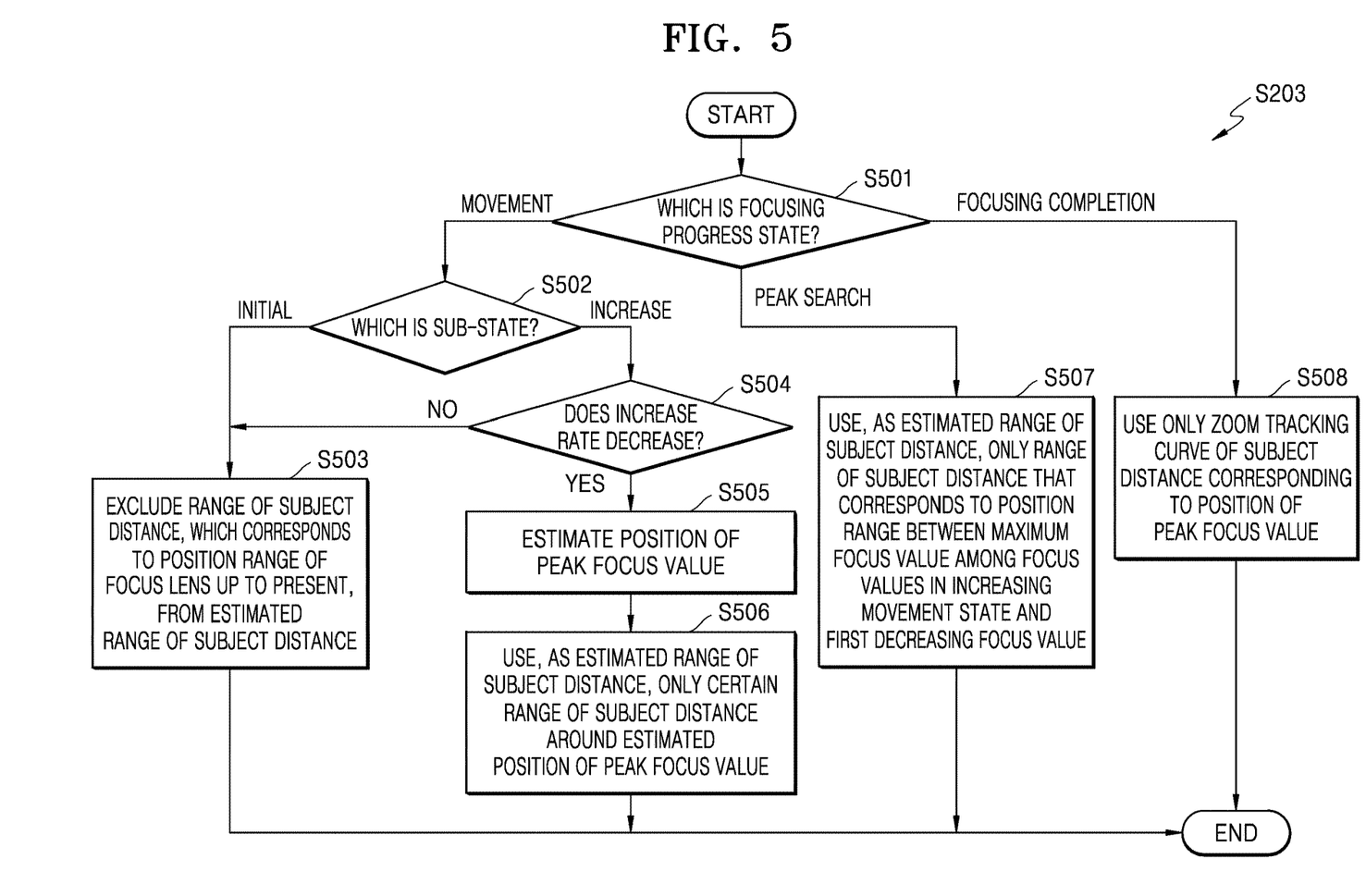
FIG. 5 is a flowchart showing sub-operations of operation S203 in FIG. 2, in which an estimated range is narrowed or a subject distance is estimated.

FIG. 5 illustrates sub-operations of operation S203 in FIG. 2, in which the estimated range is narrowed or the subject distance is estimated. As described above with reference to FIG. 3, the focusing progress state in operation S203, in which the estimated range is narrowed, is the initial movement state (0→A), the increasing movement state (A→D), the peak search state (D↔B), or the focusing completion state (C).

In the initial movement state (0→A), a focus lens is moved while a focus value is not increasing.

In the increasing movement state (A→D), the focus lens is moved while the focus value is increasing.

In the peak search state (D↔B), the position of a peak focus value is searched for after a first decreasing focus value is detected in the increasing movement state (A→D).

In the focusing completion state (C), the focus lens is at the position of the peak focus value after the position of the peak focus value is found in the peak search state (D↔B).

The sub-operations of operation S203 will be described with reference to FIGS. 3 and 5.

The control unit 107 determines a current focusing progress state in operation S501. When the focusing progress state is a movement state (0→D), the control unit 107 determines a sub-state in operation S502.

When the focusing progress state is the initial movement state (0→A), the control unit 107 excludes a range of the subject distance that corresponds to a position range of the focus lens up to the present from the estimated range of the subject distance in operation S503.

When the focusing progress state is the increasing movement state (A→D), the control unit 107 determines whether an increase rate decreases in operation S504.

When the focusing progress state is the increasing movement state (A→D) and the increase rate of the focus value does not decrease, the control unit 107 excludes the range of the subject distance that corresponds to the position range of the focus lens up to the present from the estimated range of the subject distance in operations S504 and S503.

When the focusing progress state is the increasing movement state (A→D) and the increase rate of the focus value decreases, the control unit 107 estimates the position of the peak focus value in operations S504 and S505.

When the focusing progress state is the increasing movement state (A→D) and the increase rate of the focus value decreases, it means that the focus value does not decrease and is near a peak (C) in operation S505. Accordingly, the position of the peak focus value may be estimated using this fact. Two methods related to the estimation have been applied by the current applicant for patents in Korea.

1) Korea Patent Application No. 2015-0054496 (Patent Publication No. 2016-0123820), entitled "Auto Focusing Method".

Abstract: A quadratic function of a rising curve (e.g., a curve in a section from A to B) is obtained, and a focus-lens position value at which a derivative of the quadratic function is zero is estimated as a peak position.

2) Korea Patent Application No. 2015-0063884 (Patent Publication No. 2016-0131460), entitled "Auto Focusing Method".

Abstract: A linear function of the straight line of a decreasing increase rate of a focus value is obtained, and a focus-lens position value corresponding to an x-intercept of the linear function is estimated as a peak position.

Accordingly, operation S505 may be performed using either of the two methods described above. Detailed descriptions thereof will be omitted here.

When operation S505 is completed, the control unit 107 uses, as the estimated range of the subject distance, only a certain range of the subject distance around an estimated position of the peak focus value in operation S506. For example, a narrow estimated range including the section between B and D may be used as the estimated range of the subject distance.

Meanwhile, when the focusing progress state is the peak search state (D<→B), the control unit 107 uses, as the estimated range of the subject distance, only a range of the subject distance that corresponds to a position range (e.g., between B and D) between a maximum focus value among focus values in the increasing movement state (A→D) and the first decreasing focus value in operation S507.

When the focusing progress state is the focusing completion state (C), the control unit 107 estimates the subject distance. In other words, the control unit 107 uses only a zoom tracking curve of the subject distance corresponding to the position of the peak focus value in operation S508.

Figure 6:
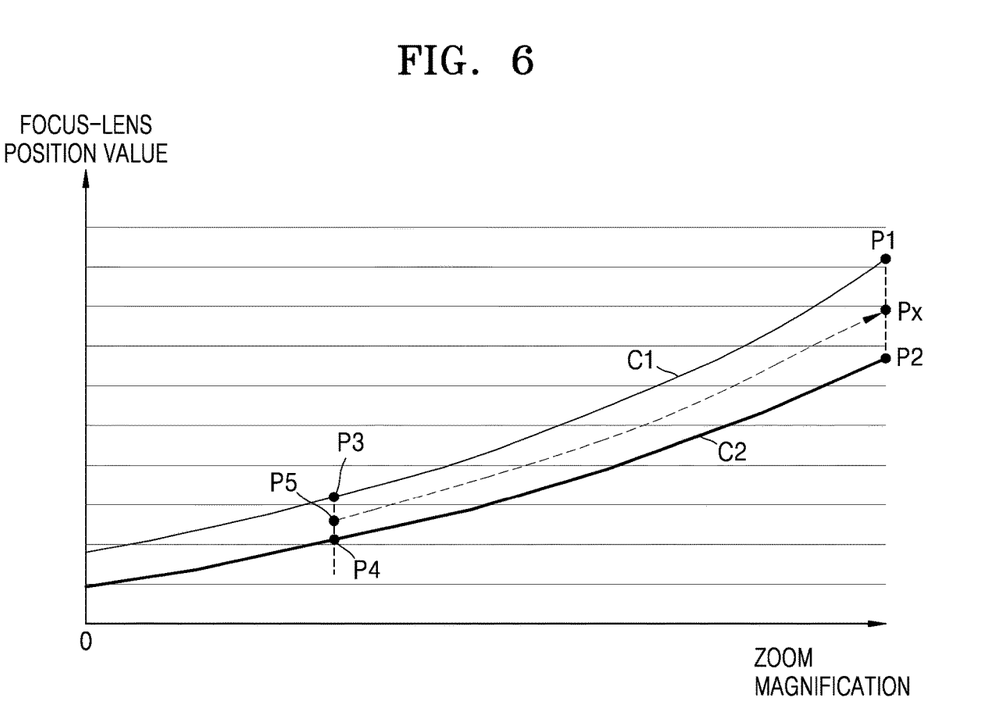
FIGS. 6 and 7 are diagrams for explaining a method of performing tracking using a single zoom tracking curve (in operation S508 in FIG. 5).
Figure 7:
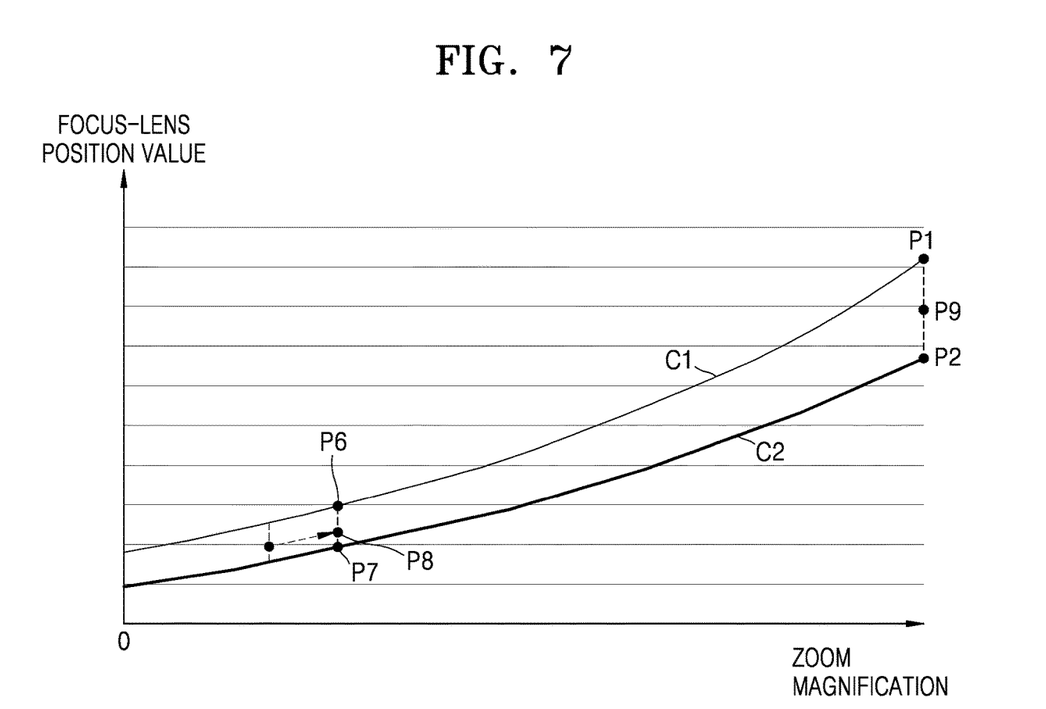

FIGS. 6 and 7 are diagrams for explaining a method of performing tracking using a single zoom tracking curve (in operation S508 in FIG. 5). Reference characters in FIGS. 6 and 7 are defined as follows:

C1 is a zoom tracking curve for a subject at an infinite distance;

C2 is a zoom tracking curve for a subject at a 10-m distance;

P1 is a focal point at a maximum zoom magnification for a subject at the infinite distance;

P2 is a focal point at the maximum zoom magnification for a subject at the infinite distance;

P3 is a focal point at a current zoom magnification for a subject at the infinite distance;

P4 is a focal point at the current zoom magnification for a subject at the 10-m distance;

P5 is a focal point at the current zoom magnification for a subject at an unknown distance;

Px is a focal point at the current zoom magnification for a subject at the unknown distance;

P6 is a focal point at a changed zoom magnification for a subject at the infinite distance;

P7 is a focal point at the changed zoom magnification for a subject at the 10-m distance;

P8 is an estimated focal point at the changed zoom magnification for a subject at the unknown distance; and P9 is a focal point at the maximum zoom magnification for a subject at the unknown distance.

The method of performing tracking using a single zoom tracking curve (in operation S508) will be described with reference to FIGS. 5 through 7.

Referring to FIG. 6, the focal point P5 corresponds to a peak focus value at the current zoom magnification. Here, the focal points P1 through P4 have been stored. Accordingly, an estimated focus value at the maximum zoom magnification for a subject at the unknown distance, i.e., a focus value of the focal point Px, may be calculated. To write simple equations, symbols are defined as follows:

Q is a difference between a focus value of the focal point P3 and a focus value of the focal point P4;

R is a difference between a focus value of the focal point P1 and a focus value of the focal point P2;

S is a difference between a focus value of the focal point P5 and the focus value of the focal point P4; and Tx is a difference between a focus value of the focal point Px and the focus value of the focal point P2.

Here, Equations 1 and 2 are established.

$$Q:R = S:Tx \quad \text{[Equation 1]}$$

$$Tx = \frac{R \times S}{Q} \quad \text{[Equation 2]}$$

Accordingly, when the focus value of the focal point P2 is F2, a focus value Fx of the focal point Px may be obtained using Equation 3:

$$F = Tx + F2 \quad \text{[Equation 3]}$$

As described above, the focal point Px may be determined based on the focus value Fx obtained using Equations 2 and 3. Accordingly, zoom tracking may be performed according to a virtual tracking curve connecting the focal point P5 and the focal point Px. This will be described with reference to FIG. 7.

Since the focal point Px in FIG. 6 is determined as described above, the focal point Px in FIG. 6 is marked with P9 in FIG. 7. To write simple equations, symbols are defined as follows:

R is a difference between a focus value of the focal point P1 and a focus value of the focal point P2;

V is a difference between a focus value of the focal point P6 and a focus value of the focal point P7;

W is a difference between a focus value of the focal point P9 and the focus value of the focal point P2; and Zx is a difference between a focus value of the focal point P8 and the focus value of the focal point P7.

Here, Equations 4 and 5 are established.

$$R:V = W:Zx \quad \text{[Equation 4]}$$

$$Zx = \frac{V \times W}{R} \quad \text{[Equation 5]}$$

Accordingly, when the focus value of the focal point P7 is F7, a focus value F8 of the focal point P8, which is unknown, may be obtained using Equation 6:

$$F8 = Zx + F7 \quad \text{[Equation 6]}$$

In other words, the estimated focal point P8 at the changed zoom magnification for a subject at the unknown distance may be used.

As described above, according to a zoom tracking method and a zoom camera of an embodiment, an estimated range of a subject distance may be narrowed or the subject distance may be estimated, according to a focusing progress state at the time when a zooming start signal is received. Since focusing is performed for a zoom magnification according to the narrowed estimated range or the estimated subject distance, as described above, a focusing speed for the zoom magnification may be increased.

Accordingly, the probability of a zoom magnification being changed after completion of focusing for the zoom magnification is increased. As a result, a user is allowed to see a clear image during zooming. In particular, in the case of a zoom camera for surveillance, a surveillance gap during the zooming may be reduced.

The present disclosure has been particularly shown and described with reference to example embodiments thereof. It will be understood by one of ordinary skill in the art that various changes in form and details may be made in the embodiments without departing from the fundamental characteristics thereof.

Therefore, the example embodiments should be considered in descriptive sense only and not for purposes of limitation. It should be construed that the scope of embodiments is defined not by the detailed description of embodiments but by the appended claims and that embodiments claimed by the claims and equivalents thereto are included in the embodiments of the present disclosure.

INDUSTRIAL APPLICABILITY

Embodiments may be used for electronic zooming as well as optical zooming.

What is claimed is:

1. A zoom tracking method performed by a control unit of a zoom camera,
the zoom tracking method comprising:
(a) determining a focusing progress state at a time when a zooming start signal is received;
(b) narrowing an estimated range of a subject distance or estimating the subject distance, according to the focusing progress state; and
(c) performing focusing for a zoom magnification, according to the narrowed estimated range or the estimated subject distance,
wherein the focusing progress state in operation (a) is one selected from
an initial movement state in which a focus lens is moved while a focus value is not increasing,
an increasing movement state in which the focus lens is moved while the focus value is increasing,
a peak search state in which a position of a peak focus value is searched for after a first decreasing focus value is detected in the increasing movement state, and
a focusing completion state in which the focus lens is at the position of the peak focus value after the position of the peak focus value is found in the peak search state,
wherein, in operation (b),
when the focusing progress state is the initial movement state, a range of the subject distance that corresponds to a position range of the focus lens up to a time when a zooming start signal is received is excluded from the estimated range of the subject distance.

2. A zoom tracking method performed by a control unit of a zoom camera,
the zoom tracking method comprising:
(a) determining a focusing progress state at a time when a zooming start signal is received;

(b) narrowing an estimated range of a subject distance or estimating the subject distance, according to the focusing progress state; and (c) performing focusing for a zoom magnification, according to the narrowed estimated range or the estimated subject distance, wherein the focusing progress state in operation (a) is one selected from an initial movement state in which a focus lens is moved while a focus value is not increasing, an increasing movement state in which the focus lens is moved while the focus value is increasing, a peak search state in which a position of a peak focus value is searched for after a first decreasing focus value is detected in the increasing movement state, and a focusing completion state in which the focus lens is at the position of the peak focus value after the position of the peak focus value is found in the peak search state, when the focusing progress state is the increasing movement state and an increase rate of the focus value does not decrease, the range of the subject distance that corresponds to the position range of the focus lens up to a time when a zooming start signal is received is excluded from the estimated range of the subject distance; and when the focusing progress state is the increasing movement state and the increase rate of the focus value decreases, the position of the peak focus value is estimated, and only a certain range of the subject distance around an estimated position of the peak focus value is used as the estimated range of the subject distance.

3. A zoom tracking method performed by a control unit of a zoom camera, the zoom tracking method comprising:

(a) determining a focusing progress state at a time when a zooming start signal is received;

(b) narrowing an estimated range of a subject distance or estimating the subject distance, according to the focusing progress state; and (c) performing focusing for a zoom magnification, according to the narrowed estimated range or the estimated subject distance, wherein the focusing progress state in operation (a) is one selected from an initial movement state in which a focus lens is moved while a focus value is not increasing, an increasing movement state in which the focus lens is moved while the focus value is increasing, a peak search state in which a position of a peak focus value is searched for after a first decreasing focus value is detected in the increasing movement state, and a focusing completion state in which the focus lens is at the position of the peak focus value after the position of the peak focus value is found in the peak search state, when the focusing progress state is the peak search state, only a range of the subject distance that corresponds to a position range between a maximum focus value among focus values in the increasing movement state and the first decreasing focus value is used as the estimated range of the subject distance.

* * * * *